United States Patent
Yang

(10) Patent No.: US 6,891,892 B2
(45) Date of Patent: May 10, 2005

(54) MPEG-2 DECODER WITH AN EMBEDDED CONTRAST ENHANCEMENT FUNCTION AND METHODS THEREFOR

(75) Inventor: Yibin Yang, Pine Brook, NJ (US)

(73) Assignee: Koninklijke Philips Electronics N.V., Eindhoven (NL)

( * ) Notice: Subject to any disclaimer, the term of this patent is extended or adjusted under 35 U.S.C. 154(b) by 756 days.

(21) Appl. No.: 09/822,435

(22) Filed: Mar. 30, 2001

(65) Prior Publication Data

US 2002/0141496 A1 Oct. 3, 2002

(51) Int. Cl.[7] .......................... H04N 7/12; H04N 11/02; G06K 9/42; G06K 9/44
(52) U.S. Cl. ..................... 375/240.25; 375/240.2; 382/235
(58) Field of Search .................. 375/240, 240.12, 375/240.2, 240.25; 382/235, 250, 274

(56) References Cited

U.S. PATENT DOCUMENTS

| | | | | |
|---|---|---|---|---|
| 5,706,216 A | * | 1/1998 | Reisch | 708/203 |
| 5,774,206 A | * | 6/1998 | Wasserman et al. | 709/247 |
| 5,832,135 A | * | 11/1998 | Merhav et al. | 382/260 |
| 6,236,751 B1 | * | 5/2001 | Farrell | 382/168 |
| 6,298,166 B1 | * | 10/2001 | Ratnakar et al. | 382/248 |
| 6,640,017 B1 | * | 10/2003 | Tsai et al. | 382/266 |

OTHER PUBLICATIONS

Biao Chen et al; "Edge Enhancement of Remote Sensing Image Data in the DCT Domain", Image and Vision Computing, Oct. 1999, Elsevier, Netherlands, vol. 17, No. 12, pp. 913–912 XP001128172.

* cited by examiner

*Primary Examiner*—Chris Kelley

(57) ABSTRACT

A MPEG-2 decoder receives an MPEG-2 video stream containing discrete cosine transform (DCT) blocks and generates linear contrast enhanced DCT blocks applied to an inverse DCT processor contained therein. Preferably, the MPEG-2 decoder includes a linear contrast enhancement processor receiving the DCT blocks and generating the linear contrast enhanced DCT blocks, and the inverse DCT processor coupled to the linear contrast enhancement processor. Additionally, the MPEG-2 decoder can include a microprocessor which controls the linear contrast enhancement processor and the inverse DCT processor. A method and a memory containing computer readable instructions permitting the microprocessor to control the MPEG-2 decoder are also described.

13 Claims, 3 Drawing Sheets

MPEG-2 DECODER WITH AN EMBEDDED CONTRAST ENHANCEMENT FUNCTION AND METHODS THEREFOR

BACKGROUND OF THE INVENTION

The present invention relates generally to a MPEG-2 decoder. More specifically, the present invention relates to a MPEG-2 decoder with an embedded contrast enhancement function. Advantageously, corresponding methods and software instructions stored in a memory are also disclosed.

Contrast enhancement is a technique for improving image quality. Linear contrast enhancement is one form of contrast enhancement that has been applied to many image processing systems and methods including MPEG-2 decoding.

Linear contrast enhancement, which is also referred to as contrast stretching, linearly expands the original digital values of the luminance data into a new distribution. It will be appreciated that by expanding the original input values of the image, the total range of sensitivity of the display device can be utilized. Linear contrast enhancement also makes subtle variations within the data, e.g., image, more obvious. In short, contrast stretching is a linear operation, which extends the narrow range of image pixel values over a wider range so that the contrast of the picture can be improved. Equation (1) shows the operation in the spatial domain:

$$\text{output} = (\text{input} - \beta) \times \alpha \tag{1}$$

where $\beta$ is the shifting parameter and $\alpha$ is the stretching factor. It will be appreciated that input and output are the luminance values of the input and output images, respectively.

The various types of linear enhancement algorithms are best applied to images with Gaussian or near-Gaussian histograms, i.e., all the luminance values fall within a narrow range on the histogram and only one mode is apparent. The three methods of linear contrast enhancement generally employed in contrast enhancing images are as follows:

1. Minimum-Maximum Linear Contrast Stretch—Here, the original minimum and maximum values of the luminance data are assigned to a newly specified set of values that utilize the full range of available brightness values. For example, in an image with a minimum brightness value of 45 and a maximum value of 205, given an eight bit range of 0–255, the values of 0 to 44 and 206 to 255 are not displayed when the image is viewed without enhancement. Additional detail in the image can be detected by stretching the minimum value of 45 to 0 and the maximum value of 205 to 255. An algorithm can be used that matches the old minimum value to the new minimum value, and the old maximum value to the new maximum value. All the old intermediate values are scaled proportionately between the new minimum and maximum values. Many digital image processing systems have built-in capabilities that automatically expand the minimum and maximum values to optimize the full range of available brightness values.

2. Percentage Linear Contrast Stretch—This is similar to the minimum-maximum linear contrast stretch except this method uses a specified minimum and maximum values that lie within a certain percentage of pixels of the mean of the histogram. In this particular variation of linear contrast enhancement, a standard deviation from the mean is often used to push the tails of the histogram beyond the original minimum and maximum values.

3. Piecewise Linear Contrast Stretch—When the distribution in a histogram of an image is bi- or tri-modal, it is often desirable to stretch certain values of the histogram for increased enhancement in selected areas. A piecewise linear contrast enhancement involves the identification of a number of linear enhancement steps that expands the brightness ranges in the modes of the histogram. In short, in the piecewise stretch, a series of small min-max stretches are set up within a single histogram to enhance selected image data.

It will be noted that existing contrast enhancement algorithms associated with MPEG-2 compression are routinely performed after decoding the MPEG2 video streams. It will also be noted that the computational complexity of linear contrast enhancement algorithms is much higher in the spatial domain than if the same contrast enhancement algorithm is implemented in the compressed domain, i.e., the Discrete Cosine Transform (DCT) or frequency domain.

Researchers working in the area of image processing systems are continually searching for contrast enhancement methods having low computational complexity. For example, the paper entitled "Edge Enhancement of Remote Sensing Image Data in the DCT Domain," (Transactions of Image and Vision Computing 17, pgs. 913–921 (1999)) by Chen et al. proposed a contrast enhancement algorithm in the DCT domain. However, the algorithm proposed by Chen et al. exhibits several problems when one attempts to employ the algorithm in MPEG-2 image processing including:

1. The algorithm employed by Chen et al. requires some information, e.g., the minimum and maximum luminance value for each single frame, from the decoded video stream. It will be appreciated that the requirement for post-decoding data makes this algorithm much less efficient and, thus, of a much higher computational complexity, than an algorithm that operates without spatial domain data.

2. Moreover, the Chen et al. algorithm also fails to discriminate between the two different type of DCT blocks, i.e., intra block (a DCT transform of a non-motion compensated block) and inter block (a DCT transform of the difference between the current block and the reference block(s)), that occur in the MPEG-2 encoded video stream. It should be noted that this will create annoying block artifacts in the final decoded pictures, i.e., the processing of the two different types of DCT compressed blocks in the same way will introduce errors into in the output image. Thus, the Chen et al. algorithm is not optimal for the processing of MPEG-2 video streams.

3. Finally, the Chen et al. algorithm attempts to expand the luminance range of the picture to fill all 256 possible levels in an eight bit data stream. It will be appreciated that this produces additional visible artifacts under some circumstance, e.g., when enhancing the contrast of an image of a dark scene. The Chen et al. algorithm would produce a bright image from a dark image, irrespective of the fact that the image is intentionally dark.

What is needed is an improved MPEG-2 decoder which contains an embedded contrast enhancement function. Preferably, the improved MPEG-2 decoder performs this contrast enhancement function entirely in the DCT domain. What is also needed is a novel linear contrast enhancement algorithm, which operates totally in the DCT domain. It would be desirable if the improved MPEG-2 decoder which contains an embedded contrast enhancement function operates at a relatively low computational complexity. It would also be desirable if the improved MPEG-2 decoder which contains an embedded contrast enhancement function were simple to implement in software and/or inexpensive to implement in hardware.

SUMMARY OF THE INVENTION

Based on the above and foregoing, it can be appreciated that there presently exists a need in the art for an improved MPEG-2 decoder containing an embedded contrast enhancement function which overcomes the above-described deficiencies. The present invention was motivated by a desire to overcome the drawbacks and shortcomings of the presently available technology, and thereby fulfill this need in the art.

According to one aspect, the present invention provides a memory storing computer readable instructions permitting a MPEG-2 decoder to perform a DCT-domain linear contrast enhancement stretching function on each DCT coefficient block corresponding to luminance data prior to performing an inverse discrete cosine transform (IDCT) function. Preferably, the MPEG-2 decoder instantiates the DCT-domain linear contrast enhancement stretching function by processing DCT blocks of the intrablock type according to the expression $$DCT[\text{output}] = \{DCT[\text{input}] - DCT[\beta]\} \times \alpha, \text{ and}$$

processing DCT blocks of the interblock type according to the expression $$DCT[\text{output}] = DCT[\text{input}] \times \alpha,$$

where
DCT[output] is the DCT transform of the output 8×8 block,
DCT[input] is the DCT transform of the input 8×8 block,
DCT[$\beta$] is the DCT transform of the 8×8 block whose every entry value is equal to $\beta$,
$\beta$ is a shifting parameter, and
$\alpha$ is a stretching factor.
In an exemplary embodiment, the memory is a non-volatile random access memory electrically coupled to a microprocessor embedded in the MPEG-2 decoder.

According to another aspect, the present invention provides a method for implementing embedded DCT-domain linear contrast enhancement processing of a MPEG-2 video signal stream, including steps for sorting DCT blocks contained in the MPEG-2 video signal stream into intrablocks, interblocks, and non-luminance blocks, processing the intrablocks according to first and second expressions to thereby produce linear contrast enhanced intrablocks, processing the interblocks according to the second expression to thereby produce linear contrast enhanced interblocks, and inverse discrete cosine transforming the linear contrast enhanced intrablocks, the linear contrast enhanced interblocks, and the non-luminance blocks in the order corresponding to the order in which the corresponding intrablocks, interblocks, and non-luminance blocks occurred in the MPEG-2 video signal stream.

According to yet another aspect, the present invention provides a MPEG-2 decoder receiving an MPEG-2 video stream containing discrete cosine transform (DCT) blocks which generates linear contrast enhanced DCT blocks applied to an inverse DCT processor. Preferably, the MPEG-2 decoder includes a linear contrast enhancement processor receiving the DCT blocks and generating the linear contrast enhanced DCT blocks, and the inverse DCT processor operatively coupled to the linear contrast enhancement processor. Additionally, the MPEG-2 decoder can include a microprocessor that controls the linear contrast enhancement processor and the inverse DCT processor. In an exemplary case, the linear contrast enhancement processor is controlled based on instructions generated by the microprocessor in responsive to instructions stored in a memory coupled to the microprocessor. In an alternative case, the linear contrast enhancement processor is controlled based on timing signals generated by the microprocessor.

BRIEF DESCRIPTION OF THE DRAWINGS

These and various other features and aspects of the present invention will be readily understood with reference to the following detailed description taken in conjunction with the accompanying drawings, in which like or similar numbers are used throughout, and in which.

DETAILED DESCRIPTION OF THE PREFERRED EMBODIMENTS

Figure 1:
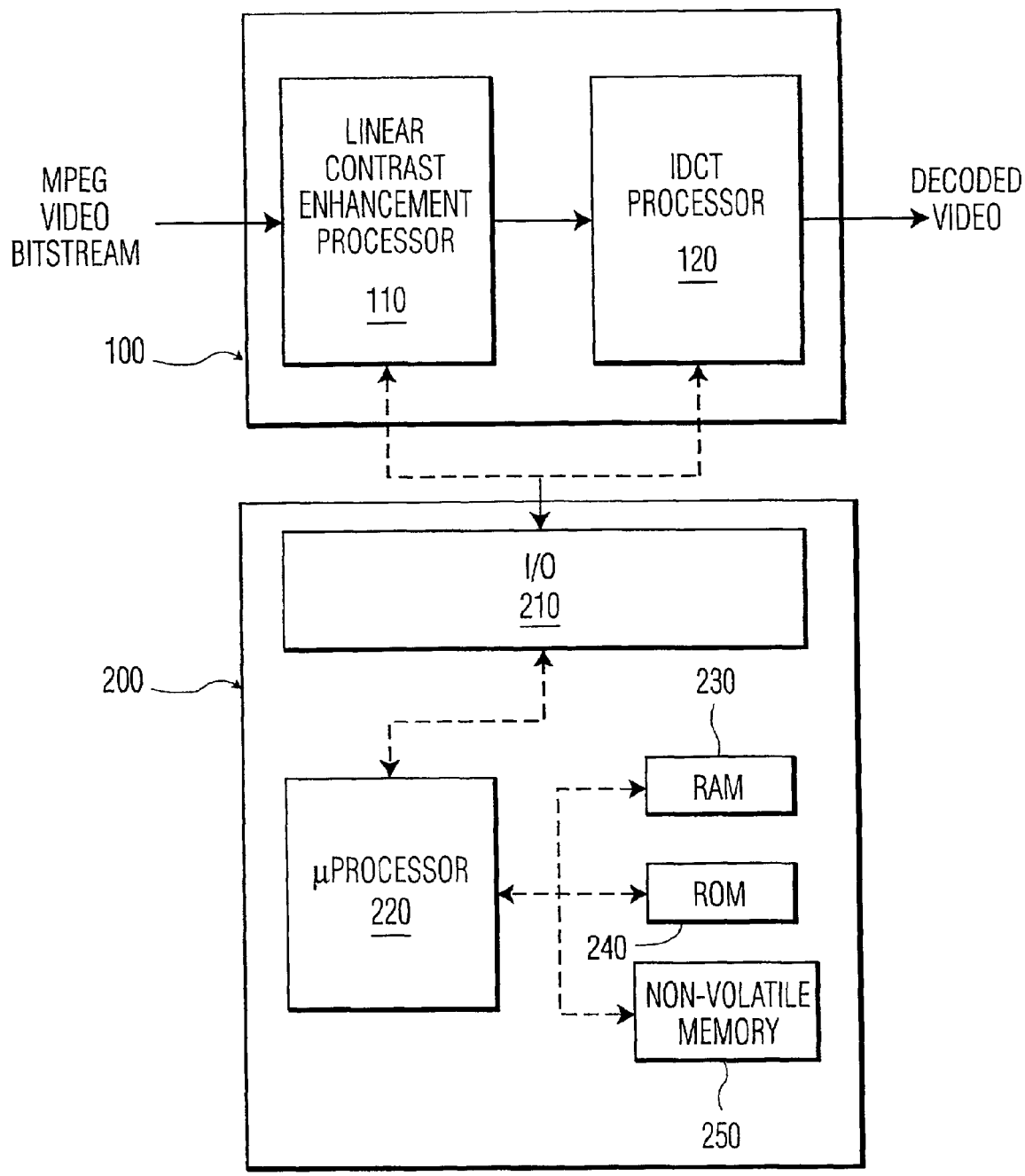
FIG. 1 is a high-level block diagram of an improved MPEG-2 decoder, which contains an embedded contrast enhancement function according to the present invention.

As discussed above, linear contrast enhancement is an extremely effective technique for improving the quality of an image. For the MPEG-2 video stream, the image contrast advantageously can be improved by simply employing the spatial domain contrast stretching algorithm after decoding the bit streams. However, contrast stretching in the frequency domain has not been practical.

Contrast stretching advantageously can be performed in the Discrete Cosine Transform (DCT), i.e., frequency, domain because it is a linear operation. The novel linear contrast enhancement algorithm according to the present invention, presented in detail below, embeds the contrast stretching operation in the MPEG-2 compressed (DCT or frequency) domain. As will be discussed in greater detail below, the embedded linear contrast enhancement processor and inverse DCT (IDCT) processor according to the present invention requires substantially fewer computations to enhance and recover a MPEG-2 coded image than those required by the standard MPEG-2 decoder stage, linear contrast enhancement processor stage, which performs spatial domain contrast stretching algorithm, in recovering the same MPEG-2 coded image. Moreover, the quality of the decoded image demonstrates measurable improvement over the standard MPEG-2 decoder without the embedded linear contrast enhancement function.

Before discussing the preferred embodiments according to the present invention, a brief discussion of the linear contrast enhancement algorithm for the DCT domain will be presented.

As mentioned above, contrast stretching is a linear operation, which extends the narrow range of image pixel values over a wider range so that the contrast of the picture can be improved. Equation (1) shows the operation in the spatial domain:

$$\text{output} = (\text{input} - \beta) \times \alpha \qquad (1)$$

where β is the shifting parameter and α is the stretching factor. It will be appreciated that input and output are the luminance values of the input and output images, respectively.

This linear contrast stretching can be calculated directly in the DCT domain using Equation (2):

$$DCT[\text{output}] = \{DCT[\text{input}] - DCT[\beta]\} \times \alpha \quad (2)$$

where DCT[output] is the DCT transform of the output 8×8 block, DCT[input] is the DCT transform of the input 8×8 block, DCT[β] is the DCT transform of the 8×8 block whose every entry value is equal to β, and α is the stretching factor.

Moreover, as mentioned above, the input MPEG-2 video streams have two different types of DCT blocks, i.e., intra blocks and inter blocks, representing luminance coefficients. The intra DCT block is the DCT transform of the non-motion compensated block; the inter DCT block is the DCT transform of the difference between the current block and the reference block(s). Thus, Equation (2) advantageously can be optimized to accommodate these two different and distinct DCT block types, i.e., intrablock and interblocks, as illustrated in Equations (3) and (4), respectively:

$$DCT[\text{output}] = \{DCT[\text{input}] - DCT[\beta]\} \times \alpha \quad (3)$$

$$DCT[\text{output}] = DCT[\text{input}] \times \alpha \quad (4)$$

It should be noted that DCT[β] has only one non-zero value, i.e., the DC coefficient, which is equal to 8×β. Thus, the subtraction operation defined in Equation (3) can be simply expressed as subtracting 8×β from the DC coefficient of the DCT[input]. It should also be noted that intrablocks are processed using Equations (3) while interblocks are processed using Equation (4).

FIG. 1 is a high-level block diagram of a preferred embodiment according to the present invention, which includes a MPEG-2 decoder 100 controlled by a central processing unit (CPU) 200. Preferably, the MPEG-2 decoder 100 includes a linear contrast enhancement processor 110 receiving a compressed MPEG-2 video stream and a IDCT processor 120 generating an image corresponding to the MPEG-2 video stream, where the processors 110 and 120 are serially coupled to one another.

Preferably, the CPU 200 includes a microprocessor 220 electrically coupled to an input/output (I/O) device 210, a random access memory (RAM) 230, a read only memory (ROM) 240, and a non-volatile random access memory (NVRAM) 250. Either (or both of) ROM 240 or NVRAM 250 can store microprocessor readable instructions by which the CPU 200 controls the MPEG-2 decoder 100 in performing the linear contrast enhancement algorithm in the DCT domain and subsequent IDCT processing.

It will be appreciated that the processors 110, 120 advantageously can be replaced by a single device, e.g., a programmable digital signal processor (DSP), controlled by CPU 200. Alternatively, the linear contrast enhancement algorithm can be hardwired into the MPEG-2 decoder 100; in that case, the CPU 200 generally provides timing signals for controlling the MPEG-2 decoder. In any event, an improved MPEG-2 decoder advantageously is embedded with the DCT domain contrast enhancement algorithm described above with respect to Equations (3) and (4). The only change in the new MPEG-2 decoder, over the standard MPEG-2 decoder, is in the front end of the Inverse DCT (IDCT) function block (IDCT processor 120).

The operation of the DCT-domain embedded linear contrast enhancement algorithm will now be described while referring to the flowchart of FIG. 2, which illustrates the novel functionality imparted to a conventional IDCT processor. It will be appreciated that the numeric expressions included in FIG. 2 describe the operation of the DCT domain linear contrast enhancement algorithm in "C" code, rather than using the Equations (3), and (4). Moreover, in FIG. 2 the term "block" is used to denote an 8×8 DCT block, irrespective of type, and "ptr" denotes a pointer to a particular DCT block.

Figure 3:
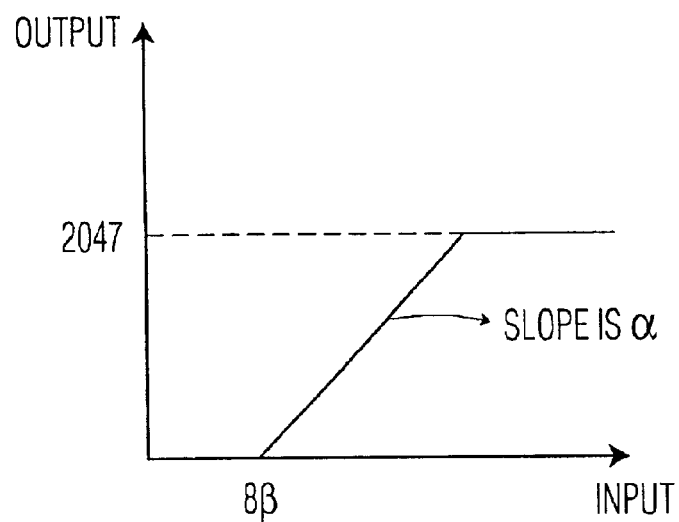
FIG. 3 finds use in understanding the modification of the DC coefficient of the intrablock processing of a DCT block in accordance with the flowchart of FIG. 2.
Figure 4:
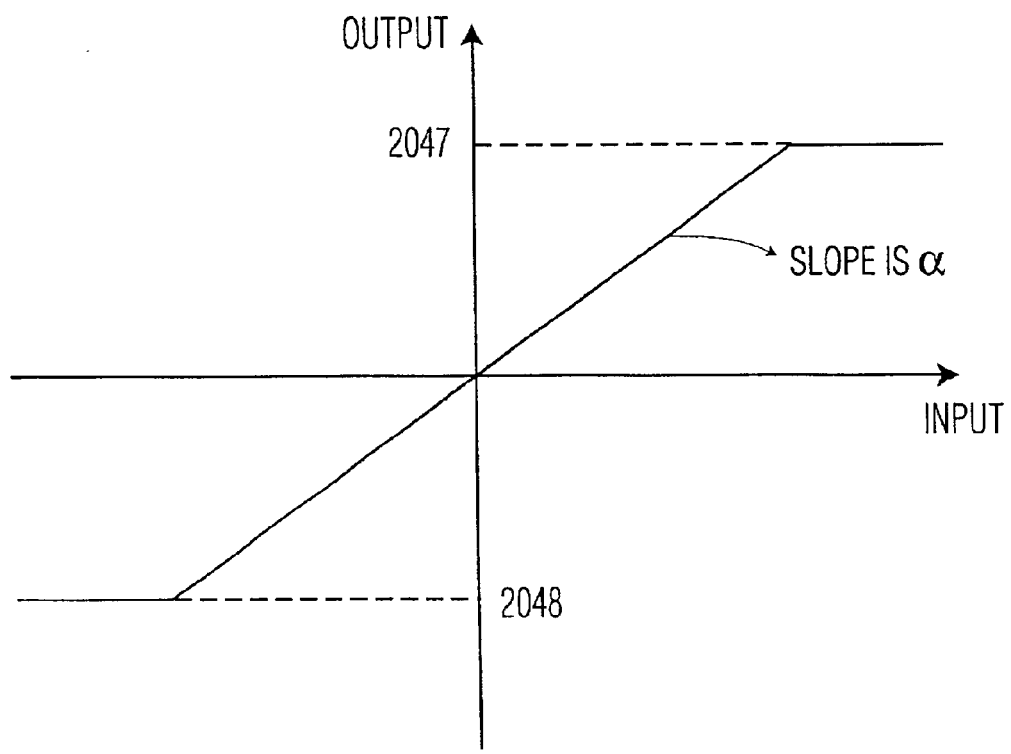
FIG. 4 finds use in understanding the modification of all coefficients in the interblock and the AC coefficients of the intrablock processing of the DCT block in accordance with the flowchart of FIG. 2.

The DCT-domain linear contrast enhancement algorithm starts by examining the current block in the MPEG-2 video stream to determine whether the block corresponds to luminance coefficients in step S1. When the answer at step S1 is YES, the algorithm steps to step S2, and determines whether the block is an intrablock. When the answer is YES, step S3 is performed. It will be appreciated that the DCT(input) is mapped to the DCT(output) in accordance with the graph depicted in FIG. 3. More specifically, FIG. 3 illustrates the effect of the linear contrast enhancement function for the DC coefficient of a DCT block of the intra block type. It will be appreciated that the output is clipped between 0 and 2047 to meet the 12-bit requirement imposed by the 8×8 IDCT processing in accordance with step S5 (discussed below). The linear contrast enhancement algorithm then jumps to step S4, as discussed below. When the answer at step S2 is NO, the algorithm jumps to step S4. In either case, the linear contrast enhancement algorithm then performs the operation specified in Equation (4). In that case, the DCT(input) is mapped to the DCT(output) in accordance with the graph depicted in FIG. 4. More specifically, FIG. 4 shows the modification function for the AC coefficients of the intra and the DC/AC coefficients when the DCT block is of the interblock type. During step S4, the output is clipped between −2048 and 2047, again to satisfy the 12-bit requirement imposed by the 8×8 IDCT processing step, i.e., step S5.

When the answer at step S1 is negative, indicating that the DCT block contains chrominance coefficients, or after steps either S3 or step S4 have been completed, the algorithm jumps to step S5, where inverse DCT processing converts the DCT block, irrespective of block type, to a decoded block.

Figure 2:
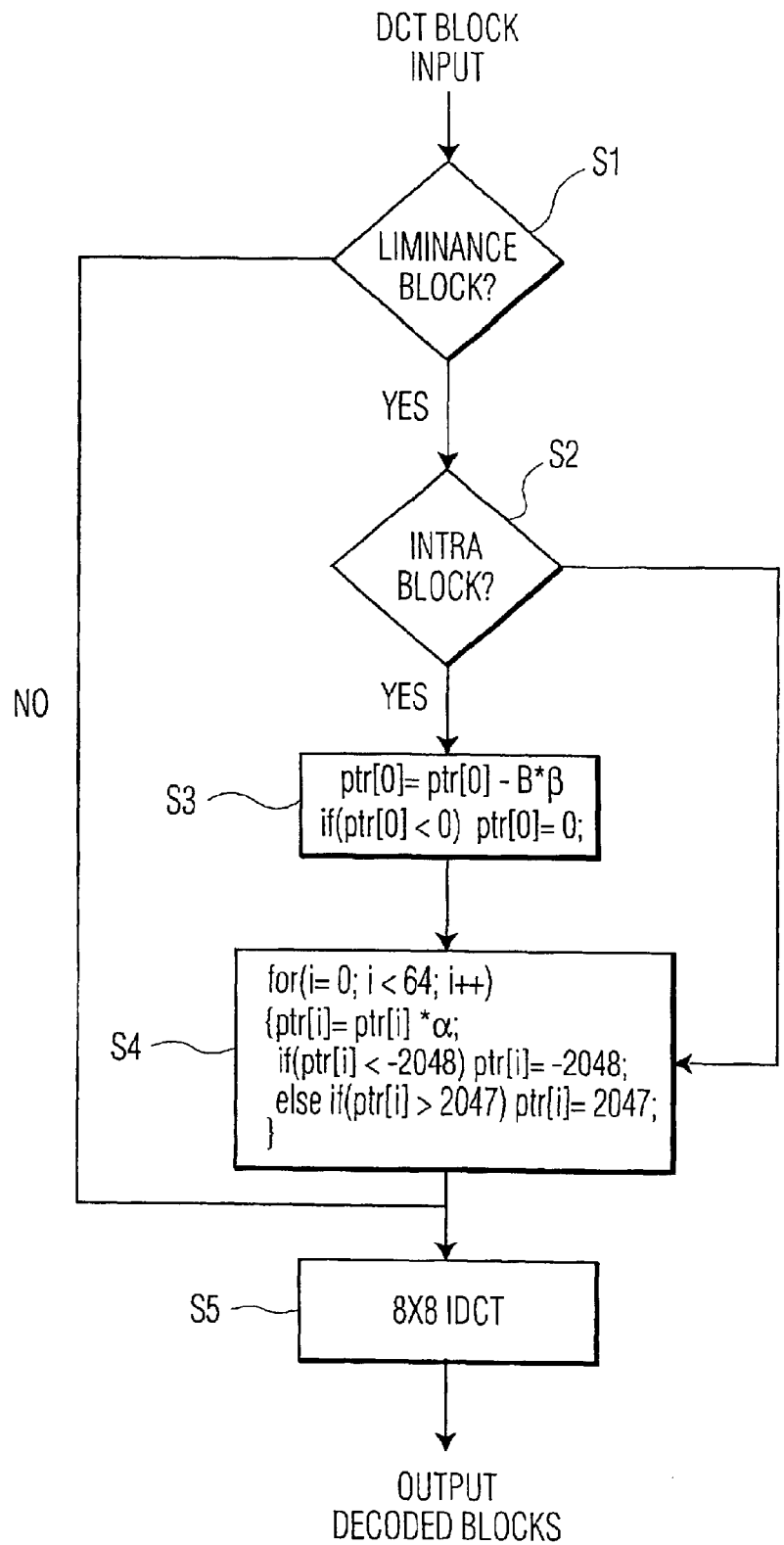
FIG. 2 is a flowchart illustrating the linear contrast enhancement function instantiated by the MPEG-2 decoder depicted in FIG. 1.

It will be appreciated that the methodology implemented using the flowchart illustrated in FIG. 2 can also be implemented in numerous other ways. For example, it will be appreciated that steps S3 and S4 can be performed in parallel when Equations (3) and (4) are separately, rather than commonly, implemented.

It should be mentioned that the picture quality is much improved by using this novel MPEG-2 decoder with the DCT-domain linear contrast enhancement algorithm embedded therein. More, irrespective of the superiority of the linear contrast enhancement algorithm according to the present invention, the computational complexity imposed by the algorithm is considerably less than that of a conventional MPEG-2 decoder employing a spatial domain contrast stretching algorithm. Stated another way, the linear contrast enhancement algorithm and corresponding MPEG-2 decoder provides a computational complexity that is demonstrably lower than that of a comparable MPEG-2 decoder implementing a spatial domain contrast stretching function. For the intra blocks, the linear contrast enhancement algorithm saves 63 subtractions per processed block. With respect to inter blocks, the new algorithm saves 64 subtractions per block. Considering the number of zeros typically found in most DCT blocks, it will be appreciated that the linear contrast enhancement algorithm according to the present invention can also eliminate a plurality of pointless multiplication steps.

Although presently preferred embodiments of the present invention have been described in detail herein, it should be clearly understood that many variations and/or modifications of the basic inventive concepts herein taught, which may appear to those skilled in the pertinent art, will still fall within the spirit and scope of the present invention, as defined in the appended claims.

What is claimed is:

1. A memory storing computer readable instructions permitting a MPEG-2 decoder to perform a DCT-domain linear contrast enhancement stretching function on each DCT coefficient block corresponding to luminance data prior to performing an inverse discrete cosine transform (IDCT) function, wherein an intrablock type of said DCT block is processed in accordance with a first process and an interblock type of said DCT block is processed in accordance with a second process.

2. The memory as recited in claim 1, wherein said first processing is according to the expression $$DCT[\text{output}] = \{DCT[\text{input}] - DCT[\beta]\} \times \alpha; \text{ and}$$

processing the DCT blocks of the interblock type according to the expression $$DCT[\text{output}] = DCT[\text{input}] \times \alpha,$$

where:

DCT[output] is the DCT transform of the output 8×8 block;

DCT[input] is the DCT transform of the input 8×8 block;

DCT[β] is the DCT transform of the 8×8 block whose every entry value is equal to β;

β is a shifting parameter, and

α is a stretching factor.

3. The memory as recited in claim 2, wherein the term DCT[β] has only one non-zero value.

4. The memory as recited in claim 2, wherein the DC coefficient of DCT[β] is equal to 8×β.

5. The memory as recited in claim 1, wherein the memory comprises non-volatile random access memory electrically coupled to a microprocessor associated with the MPEG-2 decoder.

6. A method for implementing embedded DCT-domain linear contrast enhancement processing of a MPEG-2 video signal stream, comprising:

sorting DCT blocks contained in the MPEG-2 video signal stream into intrablocks, interblocks, and non-luminance blocks;

processing the intrablocks according to a first expression to thereby produce linear contrast enhanced intrablocks;

processing the interblocks according to a second expression to thereby produce linear contrast enhanced interblocks; and inverse discrete cosine transforming the linear contrast enhanced intrablocks, the linear contrast enhanced interblocks, and the non-luminance blocks in the order corresponding to the order in which the corresponding intrablocks, interblocks, and non-luminance blocks occurred in the MPEG-2 video signal stream.

7. The method as recited in claim 6, wherein the first expression comprises:

$$DCT[\text{output}] = \{DCT[\text{input}] - DCT[\beta]\} \times \alpha;$$

where:

DCT[output] is the DCT transform of the output 8×8 block;

DCT[input] is the DCT transform of the input 8×8 block;

DCT[β] is the DCT transform of the 8×8 block whose every entry value is equal to β;

β is a shifting parameter, and

α is a stretching factor.

8. The method as recited in claim 6, wherein the second expression comprises:

$$DCT[\text{output}] = DCT[\text{input}] \times \alpha,$$

where:

DCT[output] is the DCT transform of the output 8×8 block;

DCT[input] is the DCT transform of the input 8×8 block; and

α is a stretching factor.

9. A MPEG-2 decoder, receiving an MPEG-2 video stream containing discrete cosine transform (DCT) blocks, which generates linear contrast enhanced DCT blocks applied to an inverse DCT processor, wherein said DCT blocks are sorted into intrablocks and interblocks, wherein the intrablocks are processed using a first process and the interblocks are processed using a second process.

10. The MPEG-2 decoder as recited in claim 9, further comprising:

a linear contrast enhancement processor receiving the DCT blocks and generating the linear contrast enhanced DCT blocks; and the inverse DCT processor operatively coupled to the linear contrast enhancement processor.

11. The MPEG-2 decoder as recited in claim 10, further comprising:

a microprocessor which controls the linear contrast enhancement processor and the inverse DCT processor.

12. The MPEG-2 decoder as recited in claim 11, wherein the linear contrast enhancement processor is controlled based on instructions generated by the microprocessor in response to instructions stored in a memory coupled to the microprocessor.

13. The MPEG-2 decoder as recited in claim 11, wherein the linear contrast enhancement processor is controlled based on timing signals generated by the microprocessor.

* * * * *